United States Patent

Dauvergne

[11] Patent Number: 5,867,002
[45] Date of Patent: Feb. 2, 1999

[54] ELECTROMECHANICAL DEVICE WITH VARIABLE RESISTANCE CIRCUIT FOR CONTROLLING A LOAD, PARTICULARLY OF AN ELECTRIC MOTOR

[75] Inventor: Jean Dauvergne, Fosses, France

[73] Assignee: Valeo Climatisation, La Verriere, France

[21] Appl. No.: 742,269

[22] Filed: Oct. 31, 1996

Related U.S. Application Data

[63] Continuation of Ser. No. 327,146, Oct. 21, 1994, abandoned, which is a continuation of Ser. No. 11,181, Jan. 29, 1993, abandoned.

[30] Foreign Application Priority Data

Jan. 31, 1992 [FR] France ................................ 92 01108

[51] Int. Cl.⁶ ........................................................ H02M 1/08
[52] U.S. Cl. .......................... 318/514; 388/807; 388/824; 388/840
[58] Field of Search .................................. 388/824, 839, 388/840, 841, 807, 838; 318/133, 772, 814, 508–516; 200/18, 538, 540

[56] References Cited

U.S. PATENT DOCUMENTS

| 591,267 | 10/1897 | Bradley . | |
|---|---|---|---|
| 738,871 | 9/1903 | Alexander | 388/807 |
| 1,613,891 | 1/1927 | Himel . | |
| 1,787,915 | 1/1931 | Petersen . | |
| 2,473,303 | 6/1949 | Robbins et al. . | |
| 2,519,167 | 8/1950 | Wilde . | |
| 2,675,435 | 4/1954 | Framhein . | |
| 3,416,059 | 12/1968 | Lagier . | |
| 3,670,226 | 6/1972 | Mazza | 388/840 X |
| 3,792,328 | 2/1974 | Woloszyk | 388/807 |
| 4,121,063 | 10/1978 | Aimi | 200/18 |
| 4,292,571 | 9/1981 | Cuneo | 318/17 |
| 4,316,064 | 2/1982 | Fujino | 200/18 X |
| 4,931,781 | 6/1990 | Miyakawa | 340/706 |

FOREIGN PATENT DOCUMENTS

| 395051 | 5/1924 | Germany . |
|---|---|---|
| 61-202915 | 9/1986 | Japan . |
| 156443 | 1/1921 | United Kingdom . |

OTHER PUBLICATIONS

"silicon zener diode and rectifier handbook theory, design characteristics, and applications" third edition, Motorola Inc, pp. 119, 120, 1961.

*Primary Examiner*—Brian Sircus
*Attorney, Agent, or Firm*—Morgan & Finnegan, LLP

[57] ABSTRACT

The invention concerns an electromechanical device with variable resistance circuit serving to control a load. The device comprises a connection (10) for a source of power (12), a connection (14) apt to be connected to a load (16) supplied by the source of power (12), a resistance circuit formed by a plurality of branches ($B_1$, $B_2$, ... $B_n$) mounted in parallel between the connections (10, 14) and each comprising a resistance ($R_1$, $R_2$ ... $R_n$) in series with a switch ($I_1$, $I_2$, ... $I_n$) possessing an initial contact state and mechanical means comprising a carriage (20) moveable in translation between several predetermined positions, in each of which this carriage (20) is apt to co-operate with at least one of the switches ($I_1$, $I_2$, ... $I_n$) in order to modify its initial contact state and vary the intensity of the current traversing the load. Application particularly to the speed control of a fan motor in a heating-ventilation and/or air-conditioning installation of a motor vehicle.

13 Claims, 3 Drawing Sheets

ELECTROMECHANICAL DEVICE WITH VARIABLE RESISTANCE CIRCUIT FOR CONTROLLING A LOAD, PARTICULARLY OF AN ELECTRIC MOTOR

This is a continuation of application Ser. No. 08/327,146, filed on Oct. 21, 1994 abandoned which is a continuation of application Ser. No. 08/011,181, filed on Jan. 29, 1993 abandoned.

FIELD OF THE INVENTION

This invention concerns an electromagnetic device with variable resistance circuit for controlling a load.

It applies particularly for setting the speed of an electric motor, especially the driving motor of a fan in a heating-ventilation and/or air-conditioning system of a motor vehicle.

BACKGROUND OF THE INVENTION

Electromechanical devices of this type are already known, which comprise a first connection for a source of power, a second connection apt to be connected to a load supplied by said source of power and means for controlling the intensity of the current traversing the load, these control means comprising a variable resistance circuit connected between the first and the second connections, as well as mechanical means apt to vary the resistance of the resistance circuit.

In this manner the intensity of the current traversing the load can be made to vary and, in the event this load is a motor, the speed of said motor can be made to vary.

In the case of a device of this type applied to set the speed of the motor of a fan in a motor vehicle, the control means generally comprise a multi-position switch having one control arm apt to co-operate with a given number of terminals each of which is connected to the motor by an electrical connection comprising an electric wire and a resistance of definite value.

By acting on the switch, the arm is made to co-operate with a selected terminal, this making it possible to establish an electrical connection with the motor across the corresponding resistance.

In this manner the speed of the motor can be given a value chosen from among a limited number of values, each of which is defined by an appropriate resistance. For example, the speed of the motor can be set between a zero speed, a low speed, an intermediate speed and a high speed.

In known devices of this type a multiplicity of electrical connections is required, therefore also a large number of electrical wires between the switch and the fan motor.

This makes it necessary to have a great length of wire and may lead to inverted connections and the corresponding installation is disassembled and then reinstalled.

Moreover, inasmuch as the switch is located in the instrument panel of a vehicle, while the fan motor is housed in a box located at a distance from this instrument panel, the electrical wires form a bundle of great length for which a passage between the instrument panel and the fan housing must be provided.

Finally, the terminals or contacts located in the instrument panel are not cooled and can become damaged or yet deteriorate under the effect of the heat released.

DISCUSSION OF THE INVENTION

The invention is particularly aimed at remedying the foregoing drawbacks caused by known devices.

It proposes, in fact, an electromechanical device of the type defined in the introduction, in which the resistance circuit comprises a plurality of branches mounted in parallel between the first and the second connections and each comprising a resistance in with a switch possessing an open or closed initial contact state, and in which the mechanical means comprise a carriage moveable in translation between several predetermined positions in each of which this carriage is apt to co-operate with at least one of the switches in order to modify its initial contact state.

An electromagnetic device of particularly compact structure is thus created, which can be located in proximity of a load, particularly of a motor, and this without it being necessary to provide a bundle of electrical wires like in the previous technique.

Then one merely needs to provide means for remotely controlling the movement in translation of the carriage which forms a part of the device.

In a first embodiment of the invention, each switch possesses an open initial contact state, while the carriage is apt to co-operate with each switch in order to bring it to the closed contact state.

In a preferred embodiment, each switch comprises two contacts, at a distance from one another, and the carriage is at least partially a conductor of electricity in order to provide an electrical connection between the two contacts of a switch when it is in a position of co-operation with this switch.

In this first embodiment of the invention, the carriage is apt to occupy a neutral or inactive position in which it does not co-operate with any switch, so that no current traverses the load. It can furthermore occupy several active positions in each of which it co-operates each time with a single switch in order to provide an electrical connection. In this case, the load is traversed by a current whose intensity i s defined by the value of the resistance mounted in series with this switch.

In a second embodiment of the invention, each switch possesses a closed initial contact state and the carriage is apt to co-operate with each switch in order to bring it to an open contact state.

In a preferred embodiment, each switch comprises two contacts recalled elastically towards one another in order to define said initial contact state, while the carriage is at least partially insulating in order to separate and electrically insulate the two contacts of a switch when it is in a position of co-operation with this switch.

In this second embodiment, the carriage has a body of elongated configuration extending in the direction of translation of the carriage, the latter being apt to occupy a neutral or inactive position in which it co-operates simultaneously with the respective contacts of each switch in order to bring them to an open contact state. Thus it follows that no current traverses the load.

The carriage may furthermore occupy several active positions in each of which it co-operates each time with at least one of the switches in order to bring it to an open contact state while leaving at least one switch in a closed contact state.

In the two foregoing embodiments the switches are advantageously arranged, aligned and spaced from one another in a direction corresponding to the direction of translation of the carriage.

According to another characteristic of the invention, the device comprises means for remotely controlling the movement of the carriage. These may consist for example of a cable sliding within a sheath.

When the device of the invention is applied to the control of an electric motor, for example a fan motor in a heating-ventilation and/or air-conditioning installation of a motor vehicle, a remote control is merely provided between the instrument panel and the housing of the fan.

In this arrangement the electrical contacts can be cooled by the flow of air circulating through the installation.

DETAILED DESCRIPTION OF THE DRAWINGS

Figure 1:
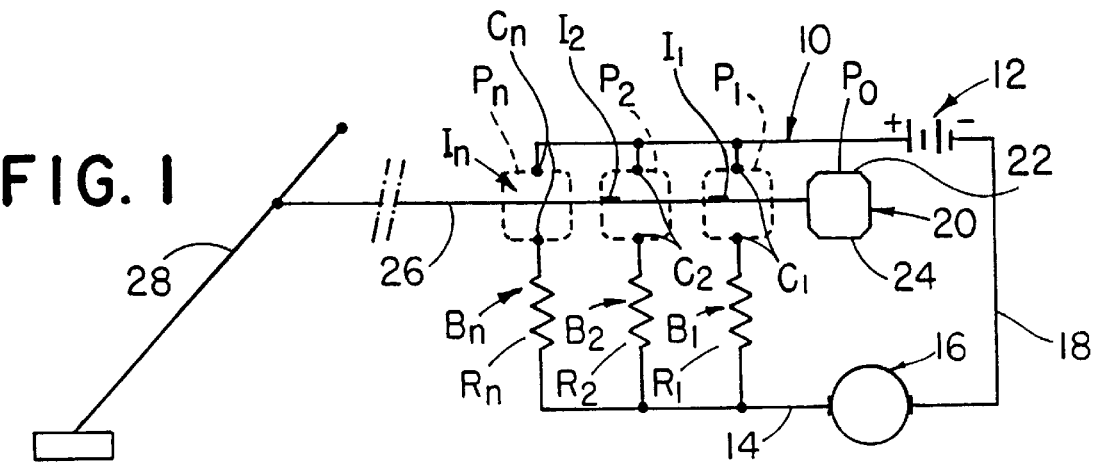
FIG. 1 is a schematic representation of an electromechanical device as in the first aforementioned embodiment, and integrated in a motor control circuit.

The electromechanical device represented in FIG. 1 comprises a first connection 10 connected to the positive pole of a source of power 12, and a second connection 14 apt to be connected to a load 16 supplied by the source of power 12 by means of an electrical connection 18 connected to the negative pole of this source of power.

By way of example, the source of power 12 can be the battery of a motor vehicle and the load 16 an electric motor, for example of a fan forming part of the heating-ventilation and/or air-conditioning installation of a motor vehicle.

The electromechanical device of FIG. 1 comprises furthermore control means which include first of all a variable resistance circuit. This resistance circuit comprises a plurality of branches $B_1$, $B_2$, . . . and $B_n$ mounted in parallel between the connections 10 and 14. The branch $B_1$ comprises a resistance $R_1$ in series with a switch $I_2$, etc., and the branch $B_n$ a resistance $R_n$ series with a switch $I_n$.

In the example, the switch $I_1$ comprises two contacts $C_1$ at a distance from one another, the switch $I_2$ two contacts $C_2$ at a distance from one another, etc., and the switch $I_n$ two contacts $C_n$ at a distance from one another. In these conditions, it will be understood that each of the switches comprises an open initial state which does not allow the current to pass in the corresponding branch. The switches $I_1$, $I_2$, . . . $I_n$ are arranged, aligned and spaced from one another in a determined direction.

The control means of the electromechanical device of FIG. 1 comprise in addition mechanical means apt to vary the resistance of the resistance circuit. In the example, mechanical means comprise a carriage 20 which is moveable in linear translation in the direction of alignment of the switches $I_1$ to $I_n$.

The carriage 20 is at least partially a conductor of electricity and comprises two opposite contact faces 22 and 24 connected electrically between them. The distance between the contact faces 22 and 24 corresponds substantially to the distance separating the contacts $C_1$ from the switch $I_1$, the two contacts $C_2$ from the switch $I_2$ and the two contacts $C_n$ from the switch $I_n$.

The carriage 20 can be moved in translation by means of a remote control which, in the example, consists of a cable 26 operated by a lever 28. The carriage 20 can occupy several different positions and particularly a neutral or inactive position $P_0$ (as represented in solid line in FIG. 1, in which the carriage does not co-operate with any of the switches $I_1$ to $I_n$. In this position, no current traverses the load 16.

The carriage can be moved in several different positions $P_1$, $P_2$, . . . $P_n$ in which it co-operates respectively with the switch $I_1$, $I_2$, . . . I.

When the carriage co-operates with one of the switches, it provides an electrical connection between the two contacts of the switch and thus allows the passage of the current across the corresponding branch. Thus, when the switch is in the position $P_1$, the current traverses the branch $B_1$ and supplies the load 16 across the resistance $R_1$.

If the load 16 is an electric motor, it will run at a speed determined in function of the value of the resistance $R_1$.

When the carriage is then moved to another position, a passage for the current is established in the corresponding branch, which makes it possible to obtain a current of different intensity and, hence, a different motor speed.

It will thus be understood that the electromechanical device can be located in immediate proximity to the load 16 and that the resistance circuit can be controlled remotely by means of the cable 26 or any other equivalent mechanical means.

In the case of a motor vehicle, it is particularly advantageous to make use of a sheathed control cable, the lever 28 being for example formed of a rotary knob placed in the instrument panel.

Figure 2:
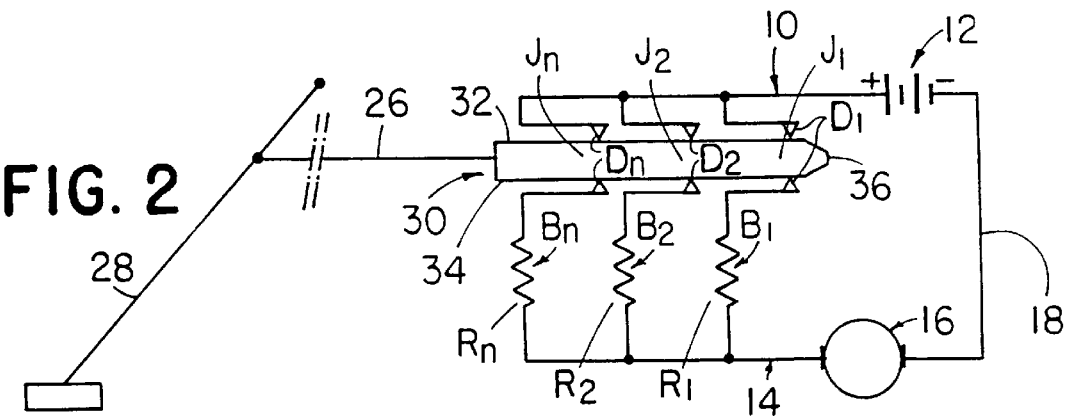
FIG. 2 is a schematic representation of an electromechanical device as in the second aforementioned embodiment, and integrated in a motor control circuit, the carriage being represented in a neutral position.
Figure 3:
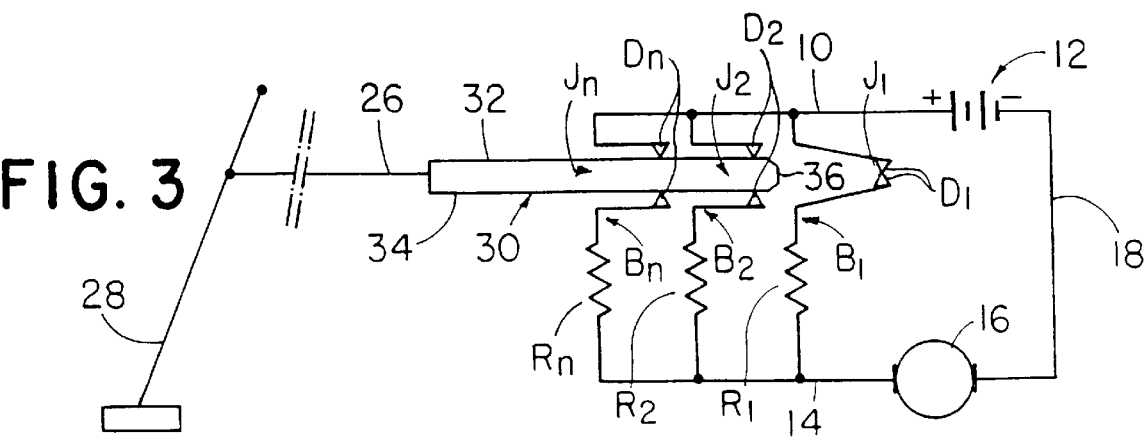
FIGS. 3 and 4 represent the circuit of FIG. 2 in two other different positions.
Figure 4:
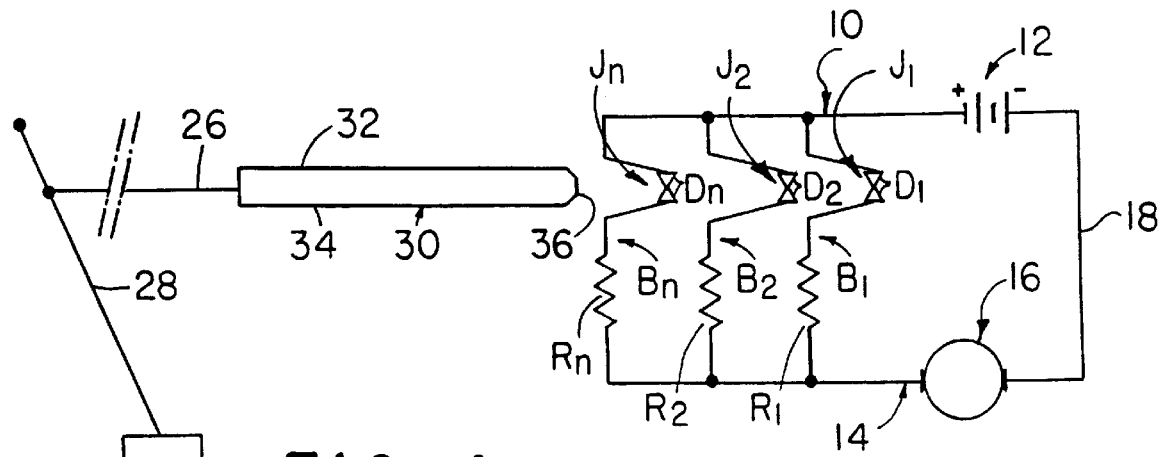

In the embodiment of FIGS. 2 to 4, to which reference is now made, the electromechanical device always comprises a first connection 10 connected to a source of power 12 and a second connection 14 apt to be connected to a load 16 supplied by a source of power 12.

In this second embodiment, the resistance circuit also comprises a plurality of branches $B_1$, $B_2$, . . . $B_n$ mounted in parallel between the connections 10 and 14. Moreover, each of the branches $B_1$, $B_2$, . . . $B_n$ comprises a resistance $R_1$, $R_2$, . . . $R_n$, in series with a switch $J_1$, $J_2$, . . . $J_n$.

However, unlike the switches $I_1$, $I_2$, . . . $I_n$ of FIG. 1, each of the switches $J_1$, $J_2$, . . . $J_n$ has a closed initial contact state.

In the example, and as is better seen in FIG. 4, the switch $J_1$ comprises two contacts $D_1$ recalled elastically towards one another, the switch $J_2$ two contacts $D_2$ recalled elastically towards one another, and the switch $J_n$ two contacts $D_n$ recalled elastically towards one another. The switches $J_1$, $J_2$, . . . $J_n$ are aligned and spaced from one another in a definite direction.

The device represented in FIGS. 2 to 4 comprises in addition a carriage 30 moveable in linear translation in th e direction of alignment of the contacts $J_1$, $J_2$, . . . $J_n$. This carriage has an insulating body of a configuration elongated in its direction of translation, having a length sufficient to bring simultaneously all t he switches $J_1$, $J_2$, . . . $J_n$ to an open state (FIG. 2).

The carriage 30 comprises two opposite faces 32 and 34 extending parallel to the direction of translation of the carriage and apt to co-operate with the contacts of switches $J_1$, $J_2$, . . . $J_n$, as well as a chamfered head 36 facilitating the gap between the contacts of the switches.

In the neutral or inactive position $P_0$ of FIG. 2, the carriage 30 co-operates simultaneously with the group of switches $J_1, J_2, \ldots J_n$ to spread apart their respective contacts $D_1, D_2, \ldots D_n$ and set them all to the open state. Consequently, in this position, no current traverses the load 16.

The carriage 30 is likewise controlled remotely by a cable 26 or similar operated by a lever 28. In the position $P_1$ represented in FIG. 3, the carriage 30 has been moved slightly in translation so that it does not co-operate with the Switch $J_1$ which is thus in its closed initial state and does co-operate with the other switches $J_1, J_2, \ldots J_n$ which are then in the open state.

Consequently, in the configuration of FIG. 3, the load 16 is traversed by an output current whose intensity is defined by the value of the resistance $R_1$.

The carriage 30 may yet assume other positions and particularly the position $P_n$ of FIG. 4 in which it co-operates with none of the switches $J_1, J_2, \ldots J_n$ these being all in their closed initial state. It follows that the resistance circuit thus obtained has a resistance R such that $1/R=1/R_1+1/R_2+ \ldots +1/R_n$.

In the particular case of an electromagnetic device applied to a motor vehicle fan motor, the number of different speeds to be provided is generally three or four.

Figure 5:
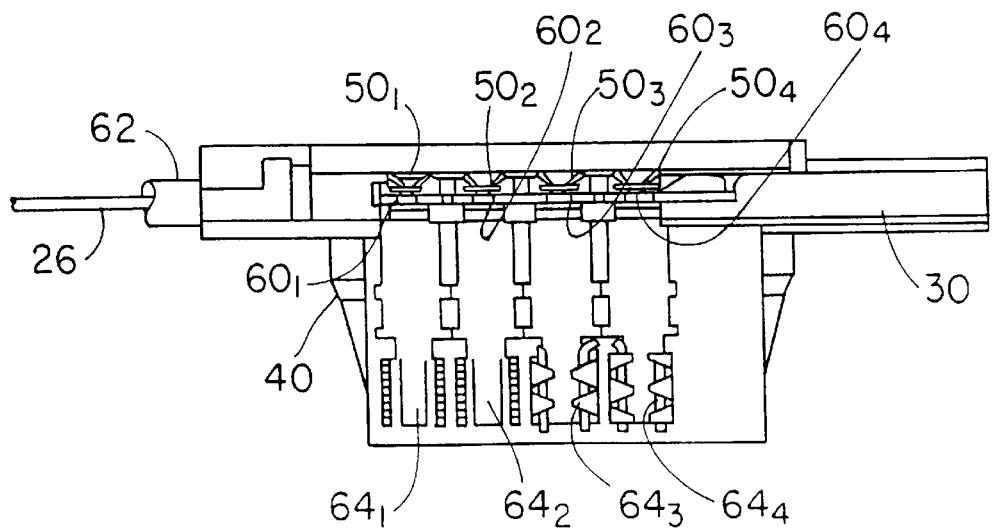
FIG. 5 is a side view of an electromechanical device according to the second embodiment.
Figure 6:
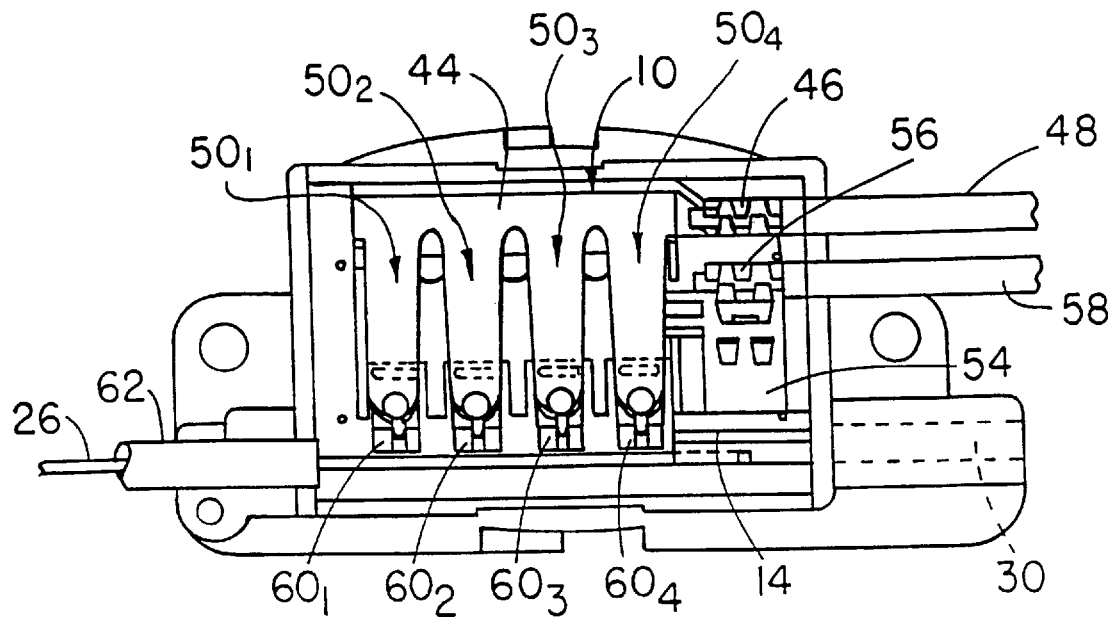
FIG. 6 is a top view of the device of FIG. 5.
Figure 7:
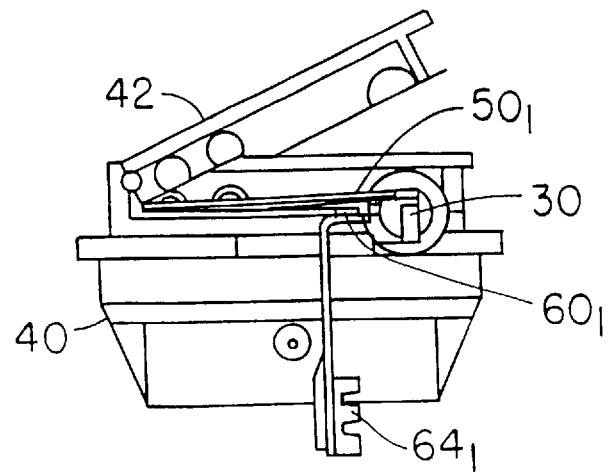
FIG. 7 is a side view of the device of FIG. 5.

Reference is now made to FIGS. 5 to 7 representing a practical form of execution of a device according to the embodiment of FIGS. 2 to 4.

The device 38 comprises an insulating block 40 provided with a pivoting cover 42 (FIG. 7).

The block 40 receives a first connection 10 formed by a strap 44 made of a metallic material, for example copper, and provided with a lug 46 for connection of an electrical wire 48 apt to be connected to the positive pole of a source of power. From the strap 44 depend, in this example, four elastic parallel tabs $50_1, 50_2, 50_3, 50_4$.

The block 40 receives furthermore a second connection 14 made in the form of an elongated strap 54 provided with a lug 56 for connection with an electrical wire 58 apt to be connected to the negative pole of the power source. The strap 54 has contacts $60_1, 60_2, 60_3, 60_4$, apt to co-operate respectively with the contacts $50_1, 50_2, 50_3, 50_4$ of the connection 10.

Owing to the elasticity of the tabs of connection 10, the contacts $50_1$ and $60_1$ are normally recalled against one another to form a switch $J_1$ in the closed initial state, and the same holds true for the other pairs of contacts.

In FIGS. 5 to 7 can be seen the carriage 30 which moves in translation by means of a cable 26 sliding within a sheath 62.

From each of these contacts $60_1, 60_2, 60_3$ and $60_4$ depend the plugs $64_1, 64_2, 64_3, 64_4$ for connection with resistances $R_1, R_2, R_3$ and $R_4$ which have not been represented in order to simplify the drawing.

It will be understood that the cover 42 serves to install the device and that it is then pivoted and clipped in order to hold the components in place.

The device represented in FIGS. 5 to 7 can therefore be made particularly compact and it can be located in proximity of the load with which it is to be associated.

In the particular case where this load is a fan motor in a motor vehicle, it is easy to control the electromechanical device remotely thanks to the cable 26 and its sheath 62, which can then be arranged between the fan motor and an appropriate control located in the instrument panel of the motor vehicle.

What is claimed is:

1. An electromechanical device comprising a first connection for a source of power, a second connection connected to a load supplied by said source of power and means to control the intensity of the current traversing the load, said control means comprising a variable resistance circuit connected between the first and second connections and mechanical means for varying the resistance of the resistance circuit, wherein the resistance circuit comprises a plurality of branches ($B_1, B_2 \ldots B_n$) at predetermined positions and mounted in parallel and electrically connected to each other between the first connection and the second connection, and wherein each branch ($B_1, B_2 \ldots B_n$) has a single resistor ($R_1, R_2 \ldots R_n$) contained in a respective branch and connected in series with a respective switch ($I_1, I_2 \ldots I_n$) and possessing an open initial contact state, and wherein the mechanical means comprises a carriage moveable in a direction of translation between said predetermined positions, wherein said carriage co-operates with a switch in order to modify an initial contact state of the switch as the carriage moves in its direction of translation into a respective predetermined position, said carriage co-operating with a switch in order to bring it to the closed contact state as the carriage moves into the respective predetermined position, each switch ($I_1, I_2 \ldots I_n$) also comprising contacts ($C_1, C_2 \ldots C_n$) at a distance from one another in that the carriage is at least partially a conductor of electricity in order to provide an electrical connection between the contact of a switch when it is in a respective predetermined position and wherein the carriage is movable between a neutral or inactive position ($P_0$) in which it co-operates with no switch, and a plurality of active positions ($P_1, P_2 \ldots P_n$) in which it co-operates with a respective switch to place a respective single resistor ($R_1, R_2 \ldots R_n$) into the circuit containing the respective switch ($I_1, I_2 \ldots I_n$), only one resistor placed into the circuit at a time.

2. The device as claim 1, wherein the carriage co-operates with a switch in order to bring a switch to a closed contact state when the carriage has moved into a corresponding predetermined position.

3. The device as in claim 2 wherein the switches ($I_1, I_2, \ldots I_n$) are arranged, aligned and spaced from one another in a direction corresponding to the direction of translation of the carriage.

4. The device as in claim 2 including means for remotely controlling the movement of the carriage.

5. The device as in claim 1 wherein the switches ($I_1, I_2, \ldots I_n$) are arranged, aligned and spaced from one another in a direction corresponding to the direction of translation of the carriage.

6. The device as in claim 1 including means for remotely controlling the movement of the carriage.

7. The device as in claim 6 wherein said means for remote control comprise a cable sliding within a sheath.

8. An electromechanical device comprising a first connection for a source of power, a second connection connected to a load supplied by said source of power and means to control the intensity of the current traversing the load, said control means comprising a variable resistance circuit connected between the first and second connections and mechanical means for varying the resistance of the resistance circuit, wherein the resistance circuit comprises a plurality of branches ($B_1, B_2 \ldots B_n$) at predetermined positions and mounted in parallel and electrically connected to each other between the first connection and the second connection and each branch ($B_1, B_2 \ldots B_n$) having a single resistor ($R_1, R_2 \ldots R_n$) contained in a respective branch and connected in series with a respective switch ($J_1, J_2 \ldots J_n$) and possessing a closed initial contact state, and wherein the mechanical means comprises a carriage moveable longitudinally in a direction of translation over said switches into a state wherein said carriage co-operates with all of said switches in order to modify the initial contact state of the switches to bring them to the open contact state, each switch ($J_1, J_2 \ldots J_n$) also comprising contacts ($C_1, C_2 \ldots C_n$) at a distance from one another and wherein the carriage is formed as an insulating body of a configuration elongated in its direction of translation, having a length sufficient to bring simultaneously all the switches ($J_1, J_2 \ldots J_n$) to an open state when the carriage is moved longitudinally to cover all of said switches, said carriage being moveable over said switches to bring them into succeeding closed states so that individual resistors ($R_1, R_2 \ldots R_n$) are brought cumulatively in the circuit as the carriage moves over the switches.

9. The device as in claim 8 wherein each switch ($J_1, J_2 \ldots J_n$) comprises two contacts ($D_1, D_2 \ldots D_n$) recalled elastically towards one another wherein the carriage is at least partially insulating in order to separate and electrically insulate the two contacts of a switch when it is in a corresponding predetermined position.

10. The device as in claim 9 including means for remotely controlling the movement of the carriage.

11. The device as in claim 8 wherein the switches (; $J_1, J_2, \ldots J_n$) are arranged, aligned and spaced from one another in a direction corresponding to the direction of translation of the carriage.

12. The device as in claim 8 wherein the carriage has a body of elongated configuration extending in the direction of translation of the carriage and being movable into a neutral or inactive position ($P_0$) where the carriage co-operates simultaneously with the respective contacts of each switch ($J_1, J_2 \ldots J_n$) causing an open contact state, and on into active positions ($P_1, P_2$) wherein the carriage co-operates with the switches having one switch in the closed contact state.

13. The device as in claim 12 including means for remotely controlling the movement of the carriage.

* * * * *